United States Patent Office 3,207,802
Patented Sept. 21, 1965

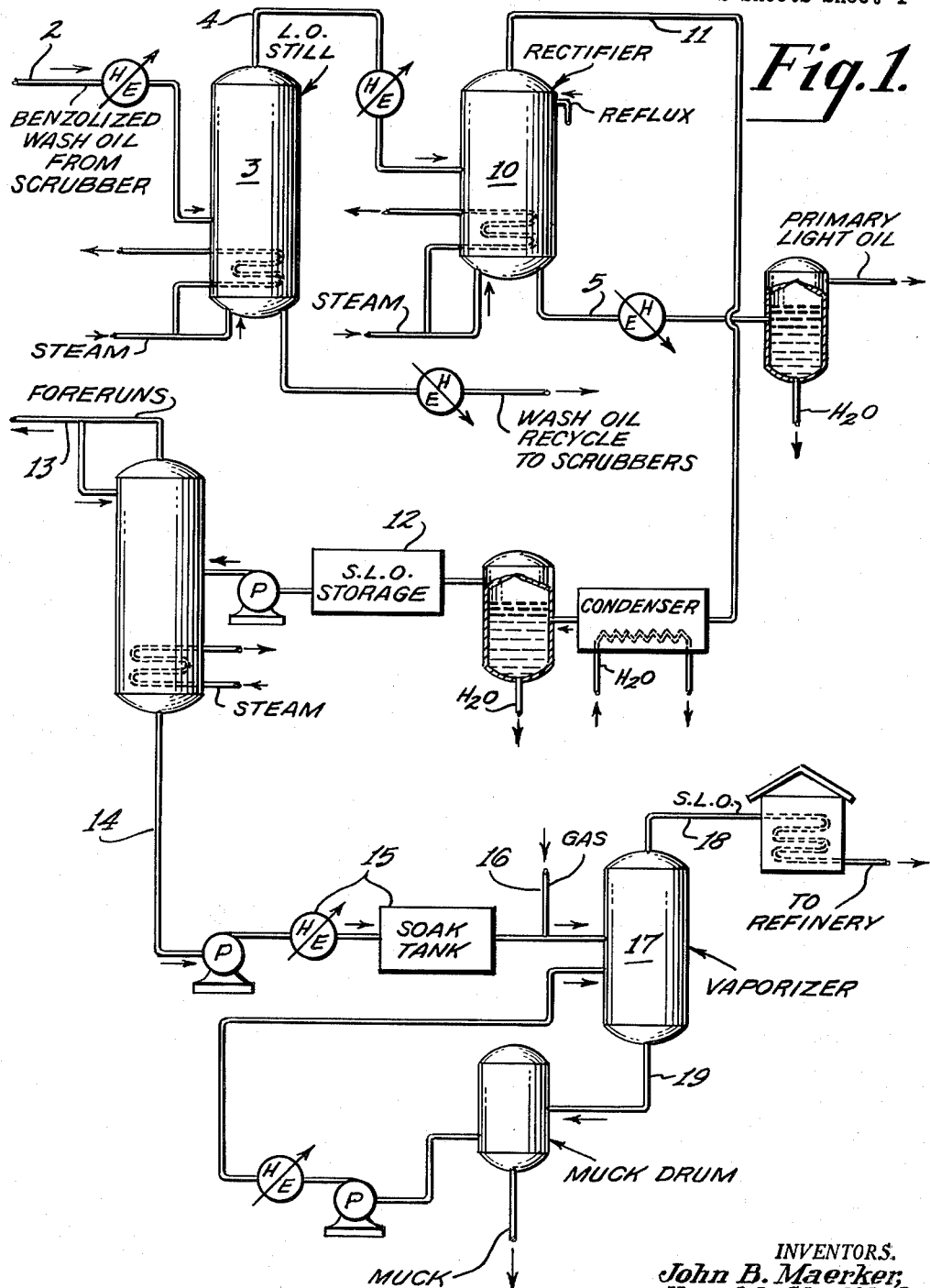

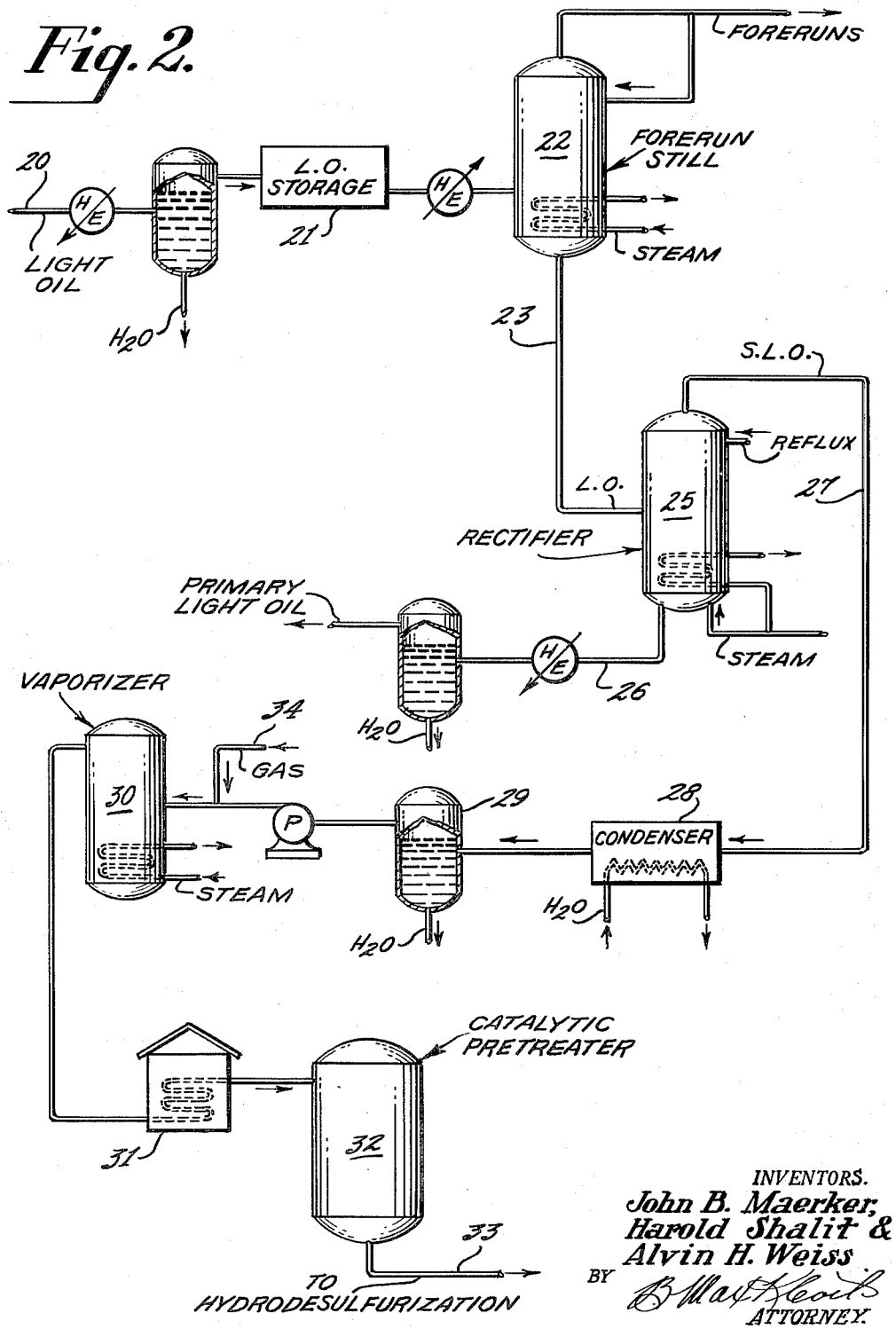

3,207,802
PURIFICATION OF COKE-OVEN LIGHT OIL
John B. Maerker, Secane, and Harold Shalit, Drexel Hill, Pa., and Alvin H. Weiss, Wilmington, Del., assignors to Air Products and Chemicals, Inc., a corporation of Delaware
Filed Dec. 14, 1960, Ser. No. 75,826
3 Claims. (Cl. 260—674)

The present invention relates to the purification of coke-oven light oil and is particularly concerned with the removal from such oil of polymerizable impurities and components which form resinous and/or carbonaceous deposits on polymerization.

Coke-oven light oils are obtained by the scrubbing of coke-oven gas with high-boiling solvents. To recover the light oil or fractions thereof from the solvent, it is subjected to a "debenzolizing" operation, which in typical modern installations involves steam stripping of the wash oil, which is thus separated from overhead vapors leaving the stripping column and containing the light oil, steam and some wash oil. The vapor stream is condensed and cooled to separate out the water and the light oil is then subjected to rectification with consequential recovery of a so-called secondary light oil which is sent to storage, comprising benzene, toluene, xylene and other components boiling within the approximate range of these aromatic hydrocarbons or up to a predetermined end point. From the bottom of the rectifier there is recovered the so-called primary light oil, sometimes called "intermediate light oil," which contains xylene and other heavy solvents, naphthalene and wash oil along with gums and gum-forming contaminants. The secondary light oil contains a small portion of volatile materials constituting the so-called "forerunnings" boiling below benzene, certain contaminants lying generally in the boiling range of the benzene through xylene fractions, including: thiophenes, saturated non-aromatic hydrocarbons, styrene and other unsaturates, together perhaps with some trace portions of indenes, dicyclopentadiene and so forth, which lie above the xylene boiling range. The particular composition of the light oil may vary not only with the nature of the original coke-oven gas, but also with the recovery system employed.

To free the coke-oven light oil of accompanying impurities for the ultimate recovery of purified aromatic hydrocarbons, chiefly benzene, it has been proposed, among other methods, to subject the same to catalytic hydrodesulfurization. These oils, however, contain sensitive and polymerizable components, particularly such as styrene and possibly some indenes, which complicate the refining process because of the readiness with which these undergo polymerization and/or decomposition to products of carbonaceous and resinous nature even when stored at ambient temperatures and at greatly accelerated rates with elevation of temperature. The removal of these polymerizable impurities by known acidic treatment is costly and cumbersome and is accompanied by considerable loss of otherwise recoverable valuable aromatic hydrocarbons.

It has also been proposed in the refining of crude benzene fractions by hydrodesulfurization, to subject the charge to preliminary heating in liquid phase at superatmospheric pressure for sufficient time to effect polymerization of susceptible impurities and then distilling off the vaporizable materials as feed to the hydrodesulfurization. Unfortunately, however, if the distillation is carried out at sufficiently high temperature to drive over mostly all of the valuable aromatic hydrocarbons, a portion of the initially formed polymer is depolymerized leading to the presence of the objectionable unsaturates in the distillate. Moreover, such pre-polymerization is difficult to attain in a system containing sulfur and other impurities which inhibit polymerization; and in addition the polymerization effected necessarily results in conversion to unrecoverable materials with consequent loss of salable product.

In accordance with the present invention, the coking and/or polymerization of components present in coke-oven light oils ordinarily leading the fouling of heat transfer surfaces and transfer lines in the refining of such oils, is overcome or effectively reduced by storing the secondary light oil charge in the presence of accompanying higher boiling materials and delaying separation of the higher boiling materials together with the polymerized materials thus formed during storage, until immediately prior to the refining operation. In preferred practice of the invention the light oil charge, after removal of the heavier components and polymers, is also subjected to mild selective hydrogenation at high throughput rates to effect saturation of potential polymer-forming materials that may still be present in the secondary light oil.

Other advantages of the invention will be understood from the detailed description below read in connection with the accompanying drawings wherein:

FIGURE 1 is a flow diagram illustrating typical prior practice in preparation and treatment of coke-oven light oil charge prior to refining for purified aromatics production;

FIGURE 2 is a flow diagram illustrating the improved operation in accordance with the present invention.

In accordance with the usual practice heretofore followed, in connection with aromatics production from light oil, as will be seen in FIGURE 1, the benzolized wash oil 2 obtained from the scrubbers of coke-oven plants, is stripped from the wash oil by steam distillation 3, providing a light oil vapor 4 which is further distilled or rectified to separate out materials 5 boiling above about 300° F., these materials being variously designated "primary light oil" or "intermediate light oil." The separation is generally accomplished by charging the scrubbed coke-oven distillate or light oil 4 to distillation equipment indicated at 10, to removed an overhead fraction 11 boiling up to about 300° F. or which steam distills at slightly above atmospheric pressure, and removing as still bottoms the undistilled higher boiling fraction 5 comprising the so-called "primary light oil." The overhead fraction 11 is condensed and sent to storage 12. Charge for the refining operation is withdrawn from the storage tanks and distilled to remove the forerun components boiling below benzene (generally at about 130° F.), which are separately recovered as indicated at 13, the remaining liquid materials 14, designated "secondary oil," being sent to desulfurization or other refining treatment for recovery of light aromatics.

In preparation for the refining operation the forerun free secondary light oil 14 is subjected to preheating and soaking in appropriate apparatus generally indicated at 15, raising the temperature of the oil to about 350° F.

which effects some polymerization of unsaturates contained therein, and the thus treated oil, which may have diluent hydrogen and hydrocarbon gas 16 added thereto, is then vaporized at about 350–360° F. at 17 to obtain the charge 18 sent to hydrodesulfurization or other refining operations.

Holding the material in storage even at ambient temperatures, over the usual and convenient periods of time, however, permits some polymerization of unsaturate components to take place. For that reason provision is usually made to remove these polymers from the vaporized charge sent to the subsequent refining operation, by draining from the vaporizer, at 19, those components which are not vaporized at the vaporizer temperature (about 360° F.) While such draining does keep out the formed polymer from the subsequent refinery reactors and lines leading thereto, a portion of such polymers formed in storage and in apparatus 15, even if present in only trace amounts, is deposited in the intervening transfer lines between the storage vessel and the vaporizer 17 and also deposits on heat exchange surfaces and coils in apparatus 15 as well as in vaporizer 17, accumulating therein to an extent causing serious fouling of these surfaces.

The fouling problem is effectively overcome in accordance with the method of the invention, which is illustrated in FIGURE 2. Here the initial charge of coke-oven distillate 20 from the light oil still corresponds to that shown at 4 in FIGURE 1. This material is sent to storage at 21 without previous removal of the primary light oils. To supply refinery charge, the light oil is withdrawn from storage and stripped at 22 of foreruns boiling up to about 130° F. The forerun-free light oil 23 is then fractionated at 25 to separate out the primary oil (above about 300° F.) as bottoms 26, from the lower boiling overhead vapor fraction 27, boiling generally in the range of 176 to 300° F. (through xylenes), constituting the secondary light oil. The latter is condensed at 28, and decanted at 29 to remove water, and then heated and vaporized for refining. For this purpose the secondary light oil, without intermediate soaking, is immediately vaporized as indicated at 30 usually with addition of hydrogen or other gaseous diluent 34. It will be seen that in the embodiment of the invention any polymer formed on storage in 21 is removed in the bottoms fraction at 26 and no provision, therefore, need be made for soaking the oil nor for withdrawal of drainings from the vaporizer as required by the previous embodiment. Once the material is distilled at 25 it can be revaporized (30) and superheated (31) without delay in preparation for the refining operation, so there is no time in this embodiment for build up of polymer.

In the operation of the refining process in accordance with known procedures or as described for example in previous application Serial No. 834,454 (and now U.S. 3,081,259), the secondary light oil to be treated is vaporized in the presence of hydrogen-rich gas under superatmospheric pressure and these vapors are then superheated initially to reaction temperature required for hydrodesulfurization of the charge. To avoid deposition of high boiling resinous polymers or coke in the catalytic reaction vessels as a result of accelerated polymerization of susceptible components of the charge at the elevated temperatures, it has been proposed to remove the polymer-forming and resinous impurities from the light oil by a pretreatment with adsorbent earth at temperatures in the order of about 840° F. or higher or by treatment with dilute acid. Such pretreatments are burdensome and expensive and lead to considerable loss of valuable products in the charge. As already indicated it has also been proposed to effect polymerization of polymerizable impurities in the charge by long soaking in liquid phase at lower temperatures (about 480° F.) and at superatmospheric pressure. Even in the latter instance it often occurs that trace or larger amounts of polymerizable impurities remain in the charge and are carried over into the hydrodesulfurization reactors or deposited enroute in the heating coils and transfer lines.

While in the method of the present invention these difficulties are largely overcome in most instances, further assurance against possible formation and deposition of polymer is provided in accordance with the preferred practice of the invention by slectively hydrogenating unsaturates in the charge at a temperature above the boiling point of the fraction and below that at which fouling is known to begin, just before introducing the charge into the hydrodesulfurization reactors. To effect the desired preliminary hydrogenation the vaporized and superheated secondary light oil from 31 is sent to a catalytic reaction vessel 32 wherein it is passed in vapor state and at high space rate over suitable hydrogenating catalyst. The hydrogenated effluent 33 is sent directly to hydrodesulfurization.

The preferred catalyst for use in the hydrogenation of unsaturates in vessel 32 which gives desired selectivity at high throughput rates, is cobalt molybdate supported on alumina and containing about 10 to 20% by weight of the oxides of cobalt and molybdenum, the $MoO_3$ being from 3.5 to 5 times that of $CoO$ by weight. Effective hydrogenation can be accomplished over the described catalyst at temperatures of 350 to 700° F. and at pressures of 400 to 1500 pounds per square inch gauge with complete hydrogenation of the non-benzenoid olefinic groups present in any styrene and indene that may be in the charge. An additional advantage of this step is that 50 to 80% of the thiophenes present are also hydrogenated, making the subsequent hydrodesulfurization that much easier. Since only a short residence time is required for the desired hydrogenation, high space rates can be employed in the order of 6 to 12 volumes (as liquid) of oil per hour per volume of catalyst or even higher in most instances. During use of the catalyst, at least part of the cobalt molybdate therein is sulfided but this does not detract from its activity. In fact, the starting fresh catalyst may be employed in presulfided state.

While the preliminary hydrogenation is described above with reference to the embodiment of the invention illustrated in FIGURE 2, it will be understood that such preliminary hydrogenation can also be utilized beneficially even in connection with prior practices as illustrated for example in FIGURE 1. Thus, the vaporized oil in line 18, instead of going directly to the hydrodesulfurization reactors may be pretreated by catalytic hydrogenation in the manner above described.

The effectiveness of the preliminary hydrogenation treatment will be appreciated from the example below.

EXAMPLE I

Secondary coke-oven light oil was subjected to hydrogenation in several different runs over alumina-supported cobalt molybdate catalyst (presulfided) at 600 p.s.i.g., at a space rate (LHSV) of 8.1 and with addition of 6.1 mols hydrogen per mol of charge. The temperature of the hydrogenation and the composition of the oil entering the hydrogenation reactor is shown in Table 1 below.

The original secondary light oil was distilled to remove forerunnings at a vapor temperature of 130° F. and the remaining oil (boiling in the range 130° F. to 300° F.), was vaporized at 600 p.s.i.g. and 340–360° F. and superheated to the reactor temperatures indicated below. The vapors were then passed to the cobalt molybdate reactor, a very small amount of tarry bottoms remained behind and was drained from the flash vessel. Drag streams of both the inlet and outlet vapor streams were cooled and the liquid portions of the streams were separated from the gaseous portions. The composition of the liquid entering and leaving the cobalt molybdate reactor in each run was determined by mass spectrograph analysis of the liquid samples, and does not account for uncondensed liquid components. This analysis does not distinguish between methyl styrene and indane.

Table 1

| Run Number | 1 | | 2 | | 3 | |
|---|---|---|---|---|---|---|
| Reactor Temp., °F | 406 | | 585 | | 690 | |
| | In | Out | In | Out | In | Out |
| MS analysis, liq. vol. percent: | | | | | | |
| Benzene | 63.52 | 68.29 | 71.29 | 64.10 | 55.41 | 58.00 |
| Toluene | 21.90 | 19.43 | 17.92 | 21.96 | 24.55 | 24.11 |
| C$_8$ Benzene | 7.92 | 8.50 | 5.70 | 10.34 | 11.01 | 12.62 |
| C$_9$ Benzene | 1.04 | 1.22 | 0.66 | 1.53 | 1.50 | 1.75 |
| Naphthalene | 0.01 | 0.01 | 0.01 | 0.01 | 0.01 | 0.01 |
| Thiophene | 0.66 | 0.16 | 0.68 | 0.10 | 0.60 | 0.11 |
| Methyl Thiophene | 0.32 | 0.26 | 0.24 | 0.06 | 0.36 | 0.19 |
| Di-methyl Thiophene | 0.12 | 0.11 | 0.09 | 0.04 | 0.17 | 0.06 |
| Styrene | 2.29 | 0.02 | 1.70 | | 3.20 | |
| Me-styrene (or Indane) | 0.93 | 1.14 | 0.59 | 0.90 | 1.36 | 1.31 |
| Dimethyl Styrene | | | | | | |
| Indene | 0.68 | 0.11 | 0.50 | 0.01 | 1.17 | 0.14 |
| Naphthenes+ Olefins | 0.30 | 0.39 | 0.31 | 0.56 | 0.31 | 1.39 |
| Thiophene conversion percent | | 52 | | 80 | | 77 |
| Styrene and indene conversion percent | | 96 | | 100 | | 97 |

The catalyst employed in the above example was prepared as follows:

A solution of ammonium molybdate was prepared by dissolving 15 parts of MoO$_3$ in an aqueous ammoniacal solution composed of 6.8 parts of water and 13.5 parts of (28% NH$_3$) NH$_4$OH, with stirring in a closed container to prevent the loss of ammonia. The solution had a density at 30° C. of 1.287.

The cobalt-containing solution was prepared by dissolving 11.6 parts of Co(NO$_3$)$_2$·6H$_2$O in 2.3 parts of water and added to 6.8 parts of ethylenediamine with stirring at a temperature in the range of 120–130° F. followed by cooling to approximately 100° F. with stirring and the addition of approximately 1 part of hydrogen peroxide (3% solution).

The solutions containing the molybdenum and cobalt salts were mixed and, upon test, showed a pH of 8.7. The mixed solution was then added to 112 parts of partially dehydrated alumina (approximately 50% alpha alumina monohydrate and 50% beta alumina trihydrate) and mulled for 30 minutes in a Lancaster mixer. The mulled material was auger extruded through a ⅛" die with the strands cut into approximately ¼" lengths. The pellets were treated at 250° F. for three hours in flowing dry air and then calcined in air at 1050° F. for two hours. This material had a surface area of 308 m.$^2$/g. as determined by nitrogen adsorption, and had a composition of about 82% by weight alumina, 3% by weight CoO, 15% by weight MoO$_3$, and 0.02% by weight Na$_2$O; and had a bulk density of 0.7.

The calcined pellets were sulfided (after cooling down) by treatment for three hours at 800° F. in a gas stream composed of 25% H$_2$S and 75% N$_2$ by volume.

The selectivity of the hydrogenation over this catalyst will be seen from the reported values of "naphthenes plus olefins" in the table, which indicate that no significant amounts of saturated aromatic nuclei are formed. On the other hand, almost complete conversion of styrene and indene is effected together with the conversion of more than half of the thiophenes.

EXAMPLE II

When the same secondary coke-oven light oil freed of forerunnings, described in the previous example, was vaporized and sent directly to hydrodesulfurization over chrome-alumina catalyst in a typical operation at 1150° F. and pressure of 600 to 700 p.s.i.g., it was found that there was an average of 0.2 to 0.3 weight percent coke per day deposited on the catalyst, evidently resulting largely from the polymerization-sensitive materials in the charge. The largest bulk of this coke was deposited at the top of the catalyst bed as well as on adjacent metal surfaces and on the inert alumina balls above the catalyst. Thus, in one such run there was over 2.0% by weight coke on the catalyst at the top 10% of the bed in 48 hours, while the lower 30% of the bed averaged less than 0.25% coke. Most of the coke is deposited at a distance of up to about 40% through the bed; below that level coking occurs at only a very low rate. For that reason it is believed that the greatest part, if not all, of the accelerated catalytic coking and/or polymerization observed is due to those sensitive and relatively unstable materials in the oil charged, such as styrenes and indenes. By hydrogenation of these unsaturated polymer-forming materials, more uniform coke deposition in the hydrodesulfurization catalyst bed is achieved and much lower overall coke rates had. Thus, when the same light oil charge was hydrogenated as described in Example I before being sent to hydrodesulfurization, lower overall coke laydown was observed, but more importantly, the coke formed was deposited fairly uniformly throughout the catalyst bed.

The ultimate hydrodesulfurization of the preheated oil freed of polymerizable contaminants can be carried out by methods already known in the art. In the preferred practice, there are utilized the methods described in copending Donovan et al. application Serial No. 834,454 of August 18, 1959, and now U.S. 3,081,259. As therein described, the charge is introduced in the hydrodesulfurization reactor together with hydrogen at inlet temperature of about 1100–1110° F. and therein contacted at 400–1000 p.s.i.g. with high activity chromia-alumina catalyst so that during reaction temperatures of at least 1170° F. are reached. Space rates are preferably employed such that under the reaction conditions the nominal residence time of the oil in the reactor is between about 1 to 3 minutes. The obtained effluent is flashed to remove fixed gas including H$_2$S and H$_2$ and the remaining hydrocarbons distilled to separate purified aromatics, those boiling above benzene being recycled to the hydrodesulfurization reactor, if desired to increase benzene yield.

Obviously, many modifications and variations of the invention as hereinbefore set forth may be made without departing from the spirit and scope thereof, and therefore only such limitations should be imposed as are indicated in the appended claims.

What is claimed is:

1. In the recovery of aromatic hydrocarbons of the benzene series from coke-oven light oils, the method of removing polymerizable impurities from said coke-oven light oils which comprises distilling the oil to separate the same into (1) a recovered overhead fraction boiling in the range of up to about 300° F. including aromatic hydrocarbons of the benzene series and (2) a residual bottoms fraction comprising primary light oil materials boiling above 300° F. and including polymerized components contained in the oil subjected to such distillation, and subjecting the freshly distilled overhead fraction to hydrodesulfurization.

2. The method according to claim 1 wherein the fresh distillate is subjected to selective hydrogenation prior to being admitted to hydrodesulfurization, said selective hydrogenation being carried out over cobalt molybdate catalyst at temperatures in the range of 350 to 700° F.

3. The method according to claim 2 wherein said catalyst is one containing in fresh state 10 to 20% by weight of the oxides of cobalt and molybdenum associated with alumina and these oxides are in the range of 3.5 to 5 parts by weight MoO$_3$ to each part of CoO.

(References on following page)

References Cited by the Examiner

UNITED STATES PATENTS

| | | | |
|---|---|---|---|
| 2,701,267 | 2/55 | Urban et al. | 208—255 |
| 2,770,578 | 11/56 | Haensel | 208—216 |
| 2,827,504 | 3/58 | Schmalenbach | 260—674 |
| 2,901,423 | 8/59 | Herbert et al. | 208—255 |
| 2,944,091 | 7/60 | Sonntaj | 260—674 |
| 2,951,886 | 9/60 | Paulsen | 260—674 |
| 2,979,548 | 4/61 | Clarke | 260—674 |
| 2,995,511 | 8/61 | Herbert et al. | 208—255 |
| 3,027,318 | 3/62 | Hartmann | 260—674 |

ALPHONSO D. SULLIVAN, *Primary Examiner.*